(12) United States Patent
van den Heuvel et al.

(10) Patent No.: US 8,559,577 B2
(45) Date of Patent: Oct. 15, 2013

(54) APPARATUS AND METHOD FOR TIMING OF SIGNALS

(75) Inventors: Hein van den Heuvel, Son en Breughel (NL); Gertjan Groot Hulze, Eindhoven (NL)

(73) Assignee: NXP B.V., Eindhoven (NL)

( * ) Notice: Subject to any disclaimer, the term of this patent is extended or adjusted under 35 U.S.C. 154(b) by 224 days.

(21) Appl. No.: 13/060,612

(22) PCT Filed: Aug. 24, 2009

(86) PCT No.: PCT/IB2009/053712
§ 371 (c)(1),
(2), (4) Date: May 12, 2011

(87) PCT Pub. No.: WO2010/023613
PCT Pub. Date: Mar. 4, 2010

(65) Prior Publication Data
US 2011/0268233 A1   Nov. 3, 2011

(30) Foreign Application Priority Data

Aug. 25, 2008 (EP) .................................. 08105113

(51) Int. Cl.
*H04L 7/00* (2006.01)
(52) U.S. Cl.
USPC ............................ 375/354; 370/503; 713/400
(58) Field of Classification Search
USPC .................. 375/354–355, 359, 377; 370/503; 713/375, 400, 500, 502, 600
See application file for complete search history.

(56) References Cited

U.S. PATENT DOCUMENTS

| 4,463,320 | A | | 7/1984 | Dawson |
| 6,134,655 | A | * | 10/2000 | Davis ............................... 713/1 |
| 6,445,790 | B1 | * | 9/2002 | Burgan et al. ................. 379/361 |
| 7,729,727 | B2 | | 6/2010 | Jeck et al. |
| 8,050,643 | B1 | * | 11/2011 | Wu et al. .................... 455/234.1 |
| 2006/0040627 | A1 | | 2/2006 | Koike et al. |

FOREIGN PATENT DOCUMENTS

| CN | 1985403 A | 6/2007 |
| EP | 1 394 955 A2 | 3/2004 |
| EP | 1 909 398 A1 | 4/2008 |

OTHER PUBLICATIONS

International Search Report and Written Opinion for Int'l Patent Appln. No. PCT/IB2009/053712 (Jan. 11, 2010).

* cited by examiner

*Primary Examiner* — Jean B Corrielus

(57) ABSTRACT

The invention relates to a method and an apparatus (1) for the timing of signals (2), preferably of signals (2) including fast changing disturbances, the apparatus (1) comprising a first timer (3) and a second timer (4), the first timer (3) is characterised by a first decay time (5) and first attack time (5) and the second timer (4) is characterised by a second decay time (6) and second attack time (6), the second attack time and the second decay time are faster than the first attack time and the first decay time and wherein an input signal (2) will be treated in parallel by the first timer (3) and second timer (4).

8 Claims, 1 Drawing Sheet

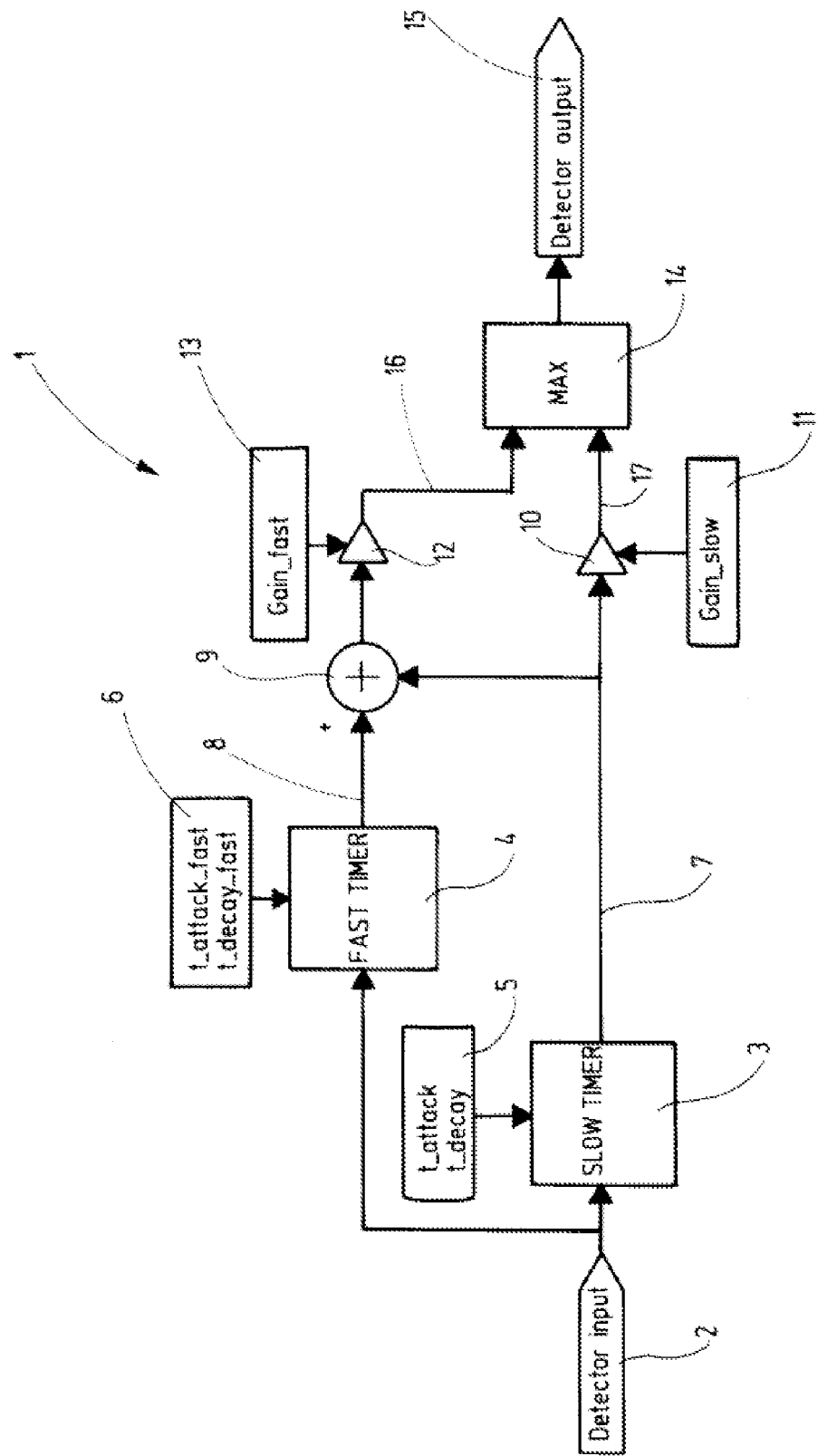

APPARATUS AND METHOD FOR TIMING OF SIGNALS

FIELD OF THE INVENTION

The invention relates to an apparatus and a method for timing of signals, preferably signals comprising fast occurring disturbances, as claimed in claim 1 and in claim 6 respectively.

BACKGROUND OF THE INVENTION

Users especially of FM radio devices know that the FM radio reception is sometimes disturbed due to so called multipath or fading effects. These disturbing effects usually originate from the fact that both a direct wave and a reflected wave from a transmitter are reaching the radio receiver and both signals are almost identical but show a time shift which finally leads to an audible disturbance.

Within auto mobile applications mobile signal reception is provided. Especially for mobile signal reception the signal disturbances are changing in time since the conditions are changing during e.g. driving of a car. While the car is moving the paths which the radio waves are taking to reach the antenna or the receiver are varying and therefore the conditions and the signal disturbances are changing quickly. Accordingly an at least almost constant change in time of the signal strength and of the relative phase of the direct signal and of the reflected signal is at last almost constantly changing. Accordingly the perceived disturbances of the signal are changing with time.

When receiving FM broadcast signals using a receiver, a mechanism is commonly used to detect the above mentioned signal disturbances. Since the disturbances can be detected measures are taken to act on the outcome of these detected disturbances e.g. by changing parameters that control the audio bandwidth, that reduce the stereo content, etc., in order to obtain a better perceived audio signal quality. This method of detecting the above mentioned disturbances of FM signals, and the method to improve the perceived audio quality is often referred to as 'weak signal handling'.

The weak signal handling shows a major drawback which is related to the speed of change at which the various control parameters can be changed. This speed of change is a critical measure with regard to the perceived audio quality. This speed of change has to be fast enough to cope with the time-varying disturbances, while the speed of change cannot be that fast that the fast changing of parameters itself leads to noticeable signal distortions.

EP 1394955 B1 discloses a system for receiving composite signal including a main component and a multi-path component in which a controller creates a phase error signal.

EP 1909398 A1 discloses an apparatus for suppressing the presence of multi-path propagation in a modulated digital signal which creates a derivative signal and applies a non-linear Teager-Kaiser function to said digital signal.

Furthermore US 2006/0040627 A1 discloses an apparatus for improving sound quality from degradation due to multipath noise in which an arithmetic unit subtracts a signal based on the detection signal of multi-path noise.

All the above mentioned systems according to the prior art show drawbacks with regard to timing of fast changing disturbances which spoil the over all signal quality.

OBJECT AND SUMMARY OF THE INVENTION

It is an object of the invention to create an apparatus and a method for timing signals preferably signals comprising fast occurring disturbances.

The object of the invention will be solved by an apparatus according to the features of claim. The inventive apparatus for the timing of signals, preferably of signals including fast changing disturbances, comprises a first timer and a second timer, the first timer is characterised by a first decay time and first attack time and the second timer is characterised by a second decay time and a second attack time, the second attack time and the second decay time are faster than the first attack time and the first decay time and wherein an input signal will be treated in parallel by the first timer and second timer.

According to the invention it is of advantage that the output signal of the first timer will be subtracted from the output signal of the second timer generating a difference signal. This allows that the fast changing disturbances can be reduced without spoiling the slow changing signals.

Accordingly, the difference signal will be amplified by an amplifier which shows at least his own gain and/or other settings, like e.g. time constants.

Furthermore it is of advantage that the output signal of the first timer will be amplified by an amplifier which shows at least his own gain and/or other settings, like e.g. time constants.

Furthermore it is of advantage that the amplified signals will be treated by a subsequent unit such that the maximum of the both signals will be forwarded as output signal.

The object of the invention will be solved by a method according to the features of claim 6. The inventive method for the timing of signals preferably of signals including fast changing disturbances includes the use of an apparatus comprising a first timer and a second timer, wherein the first timer is characterised by a first decay time and a first attack time and the second timer is characterised by a second decay time and a second attack time, and the second attack time and the second decay time are faster than the first attack time and the first decay time and wherein an input signal will be treated in parallel by the first timer and second timer.

Additionally the output signal of the first timer will be subtracted from the output signal of the second timer to generate a difference signal.

Furthermore the difference signal will be amplified by an amplifier, as already explained above. Additionally the output signal of the first timer will be amplified by an amplifier, as already explained above.

According to a preferred embodiment of the invention the amplified signals will be treated by a subsequent following unit such that the maximum of the both signals will be forwarded as output signal.

BRIEF DESCRIPTION OF THE DRAWINGS

The above and other features and advantages of the invention will be apparent from the following description of an exemplary embodiment of the invention with reference to the accompanying drawings, in which:

The Figure shows a schematic diagram of an inventive embodiment.

DESCRIPTION OF EMBODIMENTS

The Figure shows schematically a diagram 1 in which a detector input signal 2 will be fed to a slow timer 3 and additionally in parallel to a fast timer 4. The timer 3 is defined by having a predetermined attack time t_attack and a decay time t_decay, as can be seen by block 5. The timers 3, 4 are able to control the speed of change of the signal or of some undesired spectral part of the signal such that finally the audibility of disturbances is reduced.

According to the invention an additional timer 4 is provided which allows to have the possibility to have a rate of change that is different for fast-changing signal disturbances as opposed to slow-changing signal disturbances according to timer 3. The timer 4 is defined by having a predetermined attack time t_attack_fast and a decay time t_decay_fast, as can be seen by block 6.

The output 7 of the timer 3 and the output 8 of timer 4 will be subtracted from each other generating the difference signal at block 9.

Furthermore the output signal 7 will be amplified using the amplifier 10 with the gain Gain_slow 11, while the difference signal at the output of block 9 will be amplified using the amplifier 12 with the gain Gain_fast 13. Finally at block 14 the maximum signal from the two signals, the amplified signal 17 and the amplified difference signal 16 will be chosen and defined as detector output signal.

The diagram 1 accordingly shows detector input signal 2 which is at least a signal carrying information about the received signal disturbances. The addition of the fast timer block 4 in parallel to the timer 3 allows to apply a timer 4 which is capable of detecting fast occurring disturbances but preferably without disturbing the effectiveness of the signal handling of slow changing signals. This will be provided since the timer 4 is aligned in parallel to the timer 3.

Because the fast timer block 4 needs to react on fast changing disturbances only, its output 8 is subtracted by the output 7 of the slow timer block 3. This means that the signal 8 from the fast timer 4 is effectively disabled after the time that the slow timer output needs which is preferably equal to the attack time of the slow timer 3 to reach the same level as the detector input signal 2.

REFERENCES 1. diagram
2. input signal
3. timer
4. timer
5. decay time, attack time
6. decay time fast, attack time fast
7. output signal of first timer
8. output signal of first timer
9. subtraction
10. amplifier
11. gain
12. amplifier
13. gain fast
14. unit
15. output signal
16. amplified signal

The invention claimed is:

1. An apparatus for timing a signal, comprising:
   a first timer; and
   a second timer,
   wherein the first timer has a first decay time and a first attack time and the second timer has a second decay time and a second attack time,
   the second attack time and the second decay time are faster than the first attack time and the first decay time, respectively,
   wherein during operation said signal is timed in parallel by the first timer and the second timer, and
   wherein during operation an output signal of the first timer is subtracted from an output signal of the second timer to generate a difference signal.

2. An apparatus according to claim 1, wherein during operation the difference signal is amplified by an amplifier to obtain an amplified difference signal.

3. An apparatus according to claim 2, wherein during operation the output signal of the first timer is amplified by a second amplifier to obtain an amplified output signal.

4. An apparatus according to claim 3, wherein during operation the amplified difference and output signals are evaluated by a subsequent unit such that a maximum of the difference and output signals is forwarded as an output signal.

5. A method for timing a signal, comprising:
   providing an apparatus having a first timer and a second timer, wherein the first timer has a first decay time and a first attack time and the second timer has a second decay time and a second attack time, and the second attack time and the second decay time are faster than the first attack time and the first decay time, respectively,
   timing said signal in parallel using the first timer and the second timer, and
   subtracting an output signal of the first timer from an output signal of the second timer to generate a difference signal.

6. A method according to claim 5, wherein the difference signal is amplified by an amplifier.

7. A method according to claim 6, wherein the output signal of the first timer is amplified by a second amplifier.

8. A method according to claim 7, wherein the amplified difference and output signals are treated by a subsequent unit such that a maximum of the difference and output signals is forwarded as an output signal.

* * * * *